United States Patent
Ma et al.

(10) Patent No.: US 10,676,798 B2
(45) Date of Patent: Jun. 9, 2020

(54) POLY-OCTAVINYL POLYHEDRAL OLIGOMERIC SILSESQUIOXANE-ACRYLIC ACID NANO COMPOSITE AUXILIARY AGENT FOR LEATHER AND PREPARATION METHOD THEREFOR

(71) Applicants: SHAANXI UNIVERSITY OF SCIENCE & TECHNOLOGY, Xi'an (CN); Jianzhong Ma, Xi'an (CN); Lu Jia, Xi'an (CN); Dangge Gao, Xi'an (CN); Bin Lv, Xi'an (CN)

(72) Inventors: Jianzhong Ma, Xi'an (CN); Lu Jia, Xi'an (CN); Dangge Gao, Xi'an (CN); Bin Lv, Xi'an (CN)

(73) Assignee: SHAANXI UNIVERSITY OF SCIENCE & TECHNOLOGY, Xi'an (CN)

( * ) Notice: Subject to any disclaimer, the term of this patent is extended or adjusted under 35 U.S.C. 154(b) by 0 days.

(21) Appl. No.: 16/348,874

(22) PCT Filed: Jan. 13, 2017

(86) PCT No.: PCT/CN2017/071065
§ 371 (c)(1),
(2) Date: May 10, 2019

(87) PCT Pub. No.: WO2018/086250
PCT Pub. Date: May 17, 2018

(65) Prior Publication Data
US 2019/0284650 A1    Sep. 19, 2019

(30) Foreign Application Priority Data

Nov. 14, 2016 (CN) .......................... 2016 1 0998893

(51) Int. Cl.
*C14C 3/22* (2006.01)
*C08F 220/06* (2006.01)
*C08G 77/04* (2006.01)
*C08F 230/08* (2006.01)
*B82Y 35/00* (2011.01)

(52) U.S. Cl.
CPC .............. *C14C 3/22* (2013.01); *C08F 220/06* (2013.01); *C08F 230/08* (2013.01); *C08G 77/045* (2013.01); *B82Y 35/00* (2013.01)

(58) Field of Classification Search
CPC ........ C14C 3/22; C08F 220/06; C08F 230/08; C08G 77/045; B82Y 35/00
See application file for complete search history.

(56) References Cited

PUBLICATIONS

Norouzi et al. Preparation and characterization of an acrylic acid modified polyhedral oligomeric silsesquioxane and investigating its effects in a UV curable coating. Progress in Organic Coatings 90 (2016) 1-10. available online May 20, 2016.*

* cited by examiner

*Primary Examiner* — Amina S Khan
(74) *Attorney, Agent, or Firm* — CBM Patent Consulting, LLC

(57) ABSTRACT

The invention relates to a poly silsesquioxane-acrylic nano-composite auxiliary for leather process and its preparation method. By mixing octavinyl silsesquioxane, organic solvent, ammonium persulfate, distilled water and surfactant in one system, and adding acrylic acid dropwise into the mixing system, cooling to adjust pH to obtain poly silsesquioxane-acrylic nanocomposite auxiliary for leather process. The auxiliary obtained in this invention is easily to penetrate into gap of the collagen fibers, and forms nano and micro-scale combination with the leather collagen, which can further improve the multi-point combination of the acrylic polymer with the collagen. Thus, the filling property of the leather that treated by the auxiliary is improved without affect the yield of leather, and the chromium content in the waste water is significantly reduced.

3 Claims, No Drawings

POLY-OCTAVINYL POLYHEDRAL OLIGOMERIC SILSESQUIOXANE-ACRYLIC ACID NANO COMPOSITE AUXILIARY AGENT FOR LEATHER AND PREPARATION METHOD THEREFOR

TECHNICAL FIELD

The invention relates to a leather tanning auxiliary, in particular to a poly silsesquioxane-acrylic nanocomposite auxiliary for leather process and its preparation method.

BACKGROUND TECHNIQUE

Polysilsesquioxanes (POSS) is a novel organic-inorganic nanoparticle that was first synthesized in 1946 by D. W. et al. The molecular formula of POSS is $(RSiO_{1.5})_n (4 \leq n \leq 8)$, wherein R is an substituent, and may be an inert group such as H, alkyl group and aryl group, or an active group such as a vinyl group or an amino group. POSS has an inorganic skeleton and the molecular dimensions are in range of 1-3 nm. POSS has a nano-scale cubic three-dimensional structure cavity, and there are 8 modifiable sites at each of the eight Si-sites. The reactive groups can be chemically modified to react with the polymer or polymer monomer, thus having a huge potential for modification.

The acrylic polymer can form complex with chromium salt, and is a polymer tanning agent with strong bonding ability and good filling effect. This kind of tanning agent can improve the physical mechanical properties of leather, and play absorption and fixation effect to chromium ions. Compared with linear polymer, the 8 vertices of the POSS combined with acrylic polymer to form a unique multi-side chain structure, which greatly increases the number of active groups of the polymer side chain. At the same time, octavinyl silsesquioxane is copolymerized with the acrylic monomer to form a nano-hybrid material with covalent bonding between the organic-inorganic phase, and the nano-hybrid material forms nano and micro-scale combination with the leather collagen, which is expected to improve thermal stability and filling effect to leather collagen fibers. The hybrid polymer with multi-side chain can further improve the multi-point combination with the leather collagen, increase the absorption rate of chromium, reduce the pollution of tanning and achieve clean production.

DETAILS OF THE INVENTION

The purpose of the present invention is to provide a poly silsesquioxane-acrylic nanocomposite auxiliary for leather process and its preparation method. The thermal stability and filling property of the leather that treated by the auxiliary is improved, and chromium tannage dosage in tanning process can be reduced, thus the chromium content in the waste water is significantly reduced.

Technical solutions used in this invention is:

A preparation method of poly silsesquioxane (POSS)-acrylic nanocomposite auxiliary for leather process, characterized in that:

Including the following processes:

Adding octavinyl-POSS 0.1-0.5 g, organic solvent 1-15 g, ammonium persulfate 0.4-1 g, deionized water 35-40 g, surfactant 0.05-0.4 g into three-neck-flask, equipped with a digital agitator and a reflux condenser.

Adding 8-16 g acrylic acid dropwise into the reaction mixture for 30-60 min while the water bath was heated up gradually to 60° C. After reaction for 6-8 h, the polymer solution was cooled to room temperature, and the pH of the solution was adjusted to about 5.0 to obtain poly silsesquioxane-acrylic nanocomposite auxiliary for leather process.

The organic solvent is selected from the dichloromethane and dimethyl sulfoxide, dimethylformamide.

The surfactant is selected from sodium dodecyl sulfate and sodium dodecyl benzene sulfonate.

The poly silsesquioxane-acrylic nanocomposite auxiliary for leather process is prepared by this method.

The invention has the following advantages:

The poly silsesquioxane-acrylic nanocomposite auxiliary for leather process is a nano hybrid material formed by covalent bonding, which has a unique multi-side chain structure. The hybrid material was used in leather tanning process with 3.5% chromium powder, compared with the linear acrylic polymer with 3.5% chromium powder, the thickening rate of wet blue leather was increased by 21%, the shrinkage temperature was increased by 4° C. Compared with 3.5% chromium tanning, the shrinkage temperature of the wet blue leather treated by POSS hybrid polymer was increased by 5° C., the thickening rate was increased by 96% without affect the yield of leather, and the chromium content in tanning wastewater was reduced by more than 50%. The auxiliary is beneficial for the development of cleaner leather tanning agents.

SPECIFIC IMPLEMENTATION METHODS

The invention is described in detail in combination with implementation methods.

The invention relates to the preparation method of a poly silsesquioxane-acrylic nanocomposite auxiliary for leather process. This auxiliary can improve the multi-point combination of acrylic polymer with the leather collagen, increase the filling property to the leather. The preparation includes the following steps:

Adding octavinyl-POSS 0.1-0.5 g, organic solvent 1-15 g, ammonium persulfate 0.4-1 g, deionized water 35-40 g, surfactant 0.05-0.4 g into three-neck-flask, equipped with a digital agitator and a reflux condenser.

Adding 8-16 g acrylic acid dropwise into the reaction mixture for 30-60 min while the water bath was heated up gradually to 60° C. After reaction for 6-8 h, the polymer solution was cooled to room temperature, and the pH of the solution was adjusted to about 5.0 to obtain poly silsesquioxane-acrylic nanocomposite auxiliary for leather process.

The organic solvent is selected from the dichloromethane and dimethyl sulfoxide, dimethylformamide.

The surfactant is selected from sodium dodecyl sulfate and sodium dodecyl benzene sulfonate.

Example 1

Adding octavinyl-POSS 0.1 g, dimethyl sulfoxide 6 g, ammonium persulfate 0.6 g, deionized water 38 g, sodium dodecyl benzene sulfonate 0.05 g into three-neck-flask, equipped with a digital agitator and a reflux condenser. Adding 10 g acrylic acid dropwise into the reaction mixture for 30 min while the water bath was heated up gradually to 60° C. After reaction for 6 h, the polymer solution was cooled to room temperature, and the pH of the solution was adjusted to about 5.0 to obtain poly silsesquioxane-acrylic nanocomposite auxiliary for leather process.

Example 2

Adding octavinyl-POSS 0.2 g, dimethylformamide 12 g, ammonium persulfate 0.7 g, deionized water 40 g, sodium dodecyl benzene sulfonate 0.1 g into three-neck-flask, equipped with a digital agitator and a reflux condenser. Adding 15 g acrylic acid dropwise into the reaction mixture for 40 min while the water bath was heated up gradually to 60° C. After reaction for 7 h, the polymer solution was cooled to room temperature, and the pH of the solution was adjusted to about 5.0 to obtain poly silsesquioxane-acrylic nanocomposite auxiliary for leather process.

Example 3

Adding octavinyl-POSS 0.3 g, dichloromethane 10 g, ammonium persulfate 0.5 g, deionized water 36 g, sodium dodecyl benzene sulfonate 0.2 g into three-neck-flask, equipped with a digital agitator and a reflux condenser. Adding 16 g acrylic acid dropwise into the reaction mixture for 50 min while the water bath was heated up gradually to 60° C. After reaction for 8 h, the polymer solution was cooled to room temperature, and the pH of the solution was adjusted to about 5.0 to obtain poly silsesquioxane-acrylic nanocomposite auxiliary for leather process.

Example 4

Adding octavinyl-POSS 0.4 g, dichloromethane 4 g, ammonium persulfate 0.9 g, deionized water 39 g, sodium dodecyl sulfate 0.2 g into three-neck-flask, equipped with a digital agitator and a reflux condenser. Adding 10 g acrylic acid dropwise into the reaction mixture for 60 min while the water bath was heated up gradually to 60° C. After reaction for 6 h, the polymer solution was cooled to room temperature, and the pH of the solution was adjusted to about 5.0 to obtain poly silsesquioxane-acrylic nanocomposite auxiliary for leather process.

Example 5

Adding octavinyl-POSS 0.1 g, dimethyl sulfoxide 10 g, ammonium persulfate 0.8 g, deionized water 35 g, sodium dodecyl sulfate 0.3 g into three-neck-flask, equipped with a digital agitator and a reflux condenser. Adding 8 g acrylic acid dropwise into the reaction mixture for 40 min while the water bath was heated up gradually to 60° C. After reaction for 8 h, the polymer solution was cooled to room temperature, and the pH of the solution was adjusted to about 5.0 to obtain poly silsesquioxane-acrylic nanocomposite auxiliary for leather process.

The nanocomposite auxiliary was used in leather tanning process with 3.5% chromium powder, compared with the linear acrylic polymer with 3.5% chromium powder, the thickening rate of wet blue leather was increased by 21%, the shrinkage temperature was increased by 4° C. Compared with 3.5% chromium tanning, the shrinkage temperature of the wet blue leather treated by POSS hybrid polymer was increased by 5° C., the thickening rate was increased by 96% without affect the yield of leather, and the chromium content in tanning wastewater was reduced by more than 50%.

The content of the present invention is not limited to the embodiments, and any equivalent changes to the technical solutions of the present invention will be covered by the claims of the present invention.

What is claimed is:

1. A method for preparing a poly silsesquioxane (POSS)-acrylic nanocomposite auxiliary for leather process, comprising:
    step 1: preparing a reaction mixture by adding 0.1-0.5 g of octavinyl-POSS, 1-15 g of organic solvent, 0.4-1 g of ammonium persulfate, 35-40 g of deionized water and 0.05-0.4 g of surfactant into a three-neck-flask that is equipped with a digital agitator and a reflux condenser;
    step 2: adding 8-16 g of acrylic acid dropwise into said reaction mixture for 30-60 min while heating up gradually to 60° C. in a water bath, reacting for 6-8 hours;
    step 3: cooling the polymer solution to room temperature, and adjusting pH of the polymer solution to 5.0 to obtain the poly silsesquioxane-acrylic nanocomposite auxiliary for leather process.

2. The method according to claim 1, wherein the organic solvent is selected from the group consisting of dichloromethane, dimethyl sulfoxide and dimethylformamide.

3. The method according to claim 1, wherein the surfactant is selected from the group consisting of sodium dodecyl sulfate and sodium dodecyl benzene sulfonate.

* * * * *